(12) United States Patent
Akiyama et al.

(10) Patent No.: US 8,125,206 B2
(45) Date of Patent: Feb. 28, 2012

(54) SEMICONDUCTOR DEVICE AND POWER SUPPLY USING THE SAME

(75) Inventors: Noboru Akiyama, Hitachinaka (JP); Takayuki Hashimoto, Tokai (JP); Takashi Hirao, Hitachi (JP); Koji Tateno, Takasaki (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 722 days.

(21) Appl. No.: 12/143,305

(22) Filed: Jun. 20, 2008

(65) Prior Publication Data

US 2008/0315851 A1 Dec. 25, 2008

(30) Foreign Application Priority Data

Jun. 20, 2007 (JP) ................................. 2007-162793

(51) Int. Cl.
*G05F 1/40* (2006.01)

(52) U.S. Cl. ........................................ 323/284; 323/271

(58) Field of Classification Search .......... 323/222–225, 323/268, 271, 282–285, 288
See application file for complete search history.

(56) References Cited

U.S. PATENT DOCUMENTS

| 5,903,138 A * | 5/1999 | Hwang et al. ................. 323/266 |
| 7,323,919 B2 * | 1/2008 | Yang et al. .................... 327/172 |
| 7,345,895 B2 * | 3/2008 | Zhu et al. ................... 363/21.12 |
| 7,378,889 B2 * | 5/2008 | Wu .............................. 327/176 |

FOREIGN PATENT DOCUMENTS

JP 2003-070247 A 3/2003

OTHER PUBLICATIONS

Ravi Murugeshappa and Brett Etter, Nikkei Electronics, Jun. 5, 2006, pp. 138-143.

* cited by examiner

*Primary Examiner* — Matthew Nguyen
(74) *Attorney, Agent, or Firm* — Miles & Stockbridge P.C.

(57) ABSTRACT

A power-supply control IC is included in a switching power supply which drives to turn on and off a semiconductor switching device connected to a DC power supply in series to supply a predetermined constant voltage to an external load, and is a semiconductor device including a semiconductor circuit which controls on and off of the semiconductor switching device. When a current flowing through the load is abruptly increased to cause an error voltage to exceed a predetermined first threshold voltage after the end of a PWM on-pulse generated in synchronization with a switching cycle, a second PWM on-pulse is generated within the same switching cycle. Furthermore, in a plurality of switching cycles after the switching cycle in which the second PWM on-pulse is generated, the first threshold voltage for comparison with the error voltage is switched to a second threshold voltage higher than the first threshold voltage.

3 Claims, 16 Drawing Sheets

SEMICONDUCTOR DEVICE AND POWER SUPPLY USING THE SAME

CROSS-REFERENCE TO RELATED APPLICATION

The present application claims priority from Japanese Patent Application No. JP 2007-162793 filed on Jun. 20, 2007, the content of which is hereby incorporated by reference into this application.

TECHNICAL FIELD OF THE INVENTION

The present invention relates to a technology for a semiconductor device. More particularly, it relates to a technology effectively applied to a switching power supply in which a power-supply control circuit includes a semiconductor device.

BACKGROUND OF THE INVENTION

For example, a DC-DC converter widely used as an example of a power supply circuit has a configuration in which a high-side power MOSFET (Metal Oxide Semiconductor Field Effect Transistor) and a low-side power MOSFET are connected to each other in series. The high-side power MOSFET has a switch function for controlling the DC-DC converter, and the low-side MOSFET has a switch function for synchronizing. These two power MOSFETs are alternately turned on and off while synchronizing, thereby executing a conversion of a power supply voltage.

Such DC-DC converters are described in Japanese Patent Application Laid-Open Publication No. 2003-70247 (Patent Document 1) and NIKKEI ELECTRONICS, Jun. 5, 2006, pp. 138-143 (Non-Patent Document 1), in which the configuration and operation of a circuit generally used in voltage mode control are disclosed.

SUMMARY OF THE INVENTION

Meanwhile, as the voltage of a processor, a memory and others used in an information device and others has been lowered, lower voltage and larger current are required also in a power supply that supplies a voltage to these devices. As the voltage becomes lower and the current becomes larger in a power supply, when load current of a processor and a memory is changed, the change becomes abrupt, and the fluctuations of a power-supply voltage are increased, by which the operation of a load is adversely affected.

Therefore, an object of the present invention is to provide a technology capable of supplying a stabilized DC voltage to a load by suppressing fluctuations of a power-supply voltage at the time when a load current is abruptly changed, in a power supply in which the voltage becomes increasingly lower and the current becomes increasingly larger.

The above and other objects and novel characteristics of the present invention will be apparent from the description of this specification and the accompanying drawings.

The typical ones of the inventions disclosed in this application will be briefly described as follows.

That is, the present invention is directed to a semiconductor device that is included in a switching power supply which drives to turn on and off a semiconductor switching device connected to a DC power supply in series to supply a predetermined constant voltage to an external load, the semiconductor device including a semiconductor circuit which controls on and off of the semiconductor switching device, wherein, when a current flowing through the load is abruptly increased and an error voltage exceeds a predetermined first threshold voltage after the end of a PWM on-pulse generated in synchronization with a switching cycle, a second PWM on-pulse is generated within the same switching cycle.

The effects obtained by typical aspects of the present invention will be briefly described below.

According to the present invention, when the voltage is decreased due to an abrupt change of load current after the end of the PWM on-pulse and then an error voltage exceeds a predetermined threshold voltage, a second PWM on-pulse is generated within the same switching cycle, thereby suppressing fluctuations of the power-supply voltage at the time of the abrupt change of load current. Accordingly, a stabilized DC voltage can be supplied to the load.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that components having the same function are denoted by the same reference numbers throughout the drawings for describing the embodiment, and the repetitive description thereof will be omitted.

First Embodiment

Figure 1:
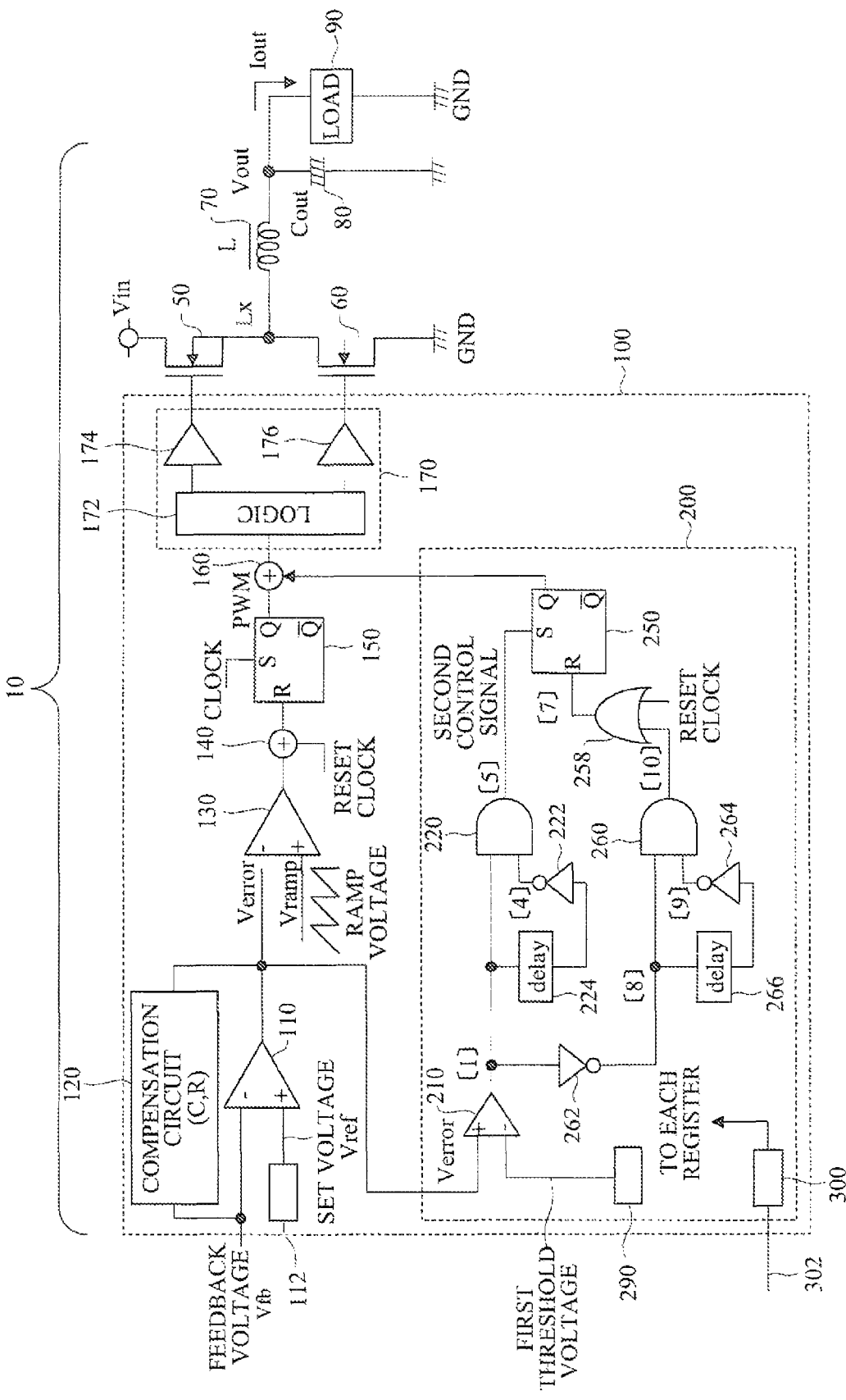
FIG. 1 is a circuit block diagram of a semiconductor device and a power supply using the same according to a first embodiment of the present invention.
Figure 2:
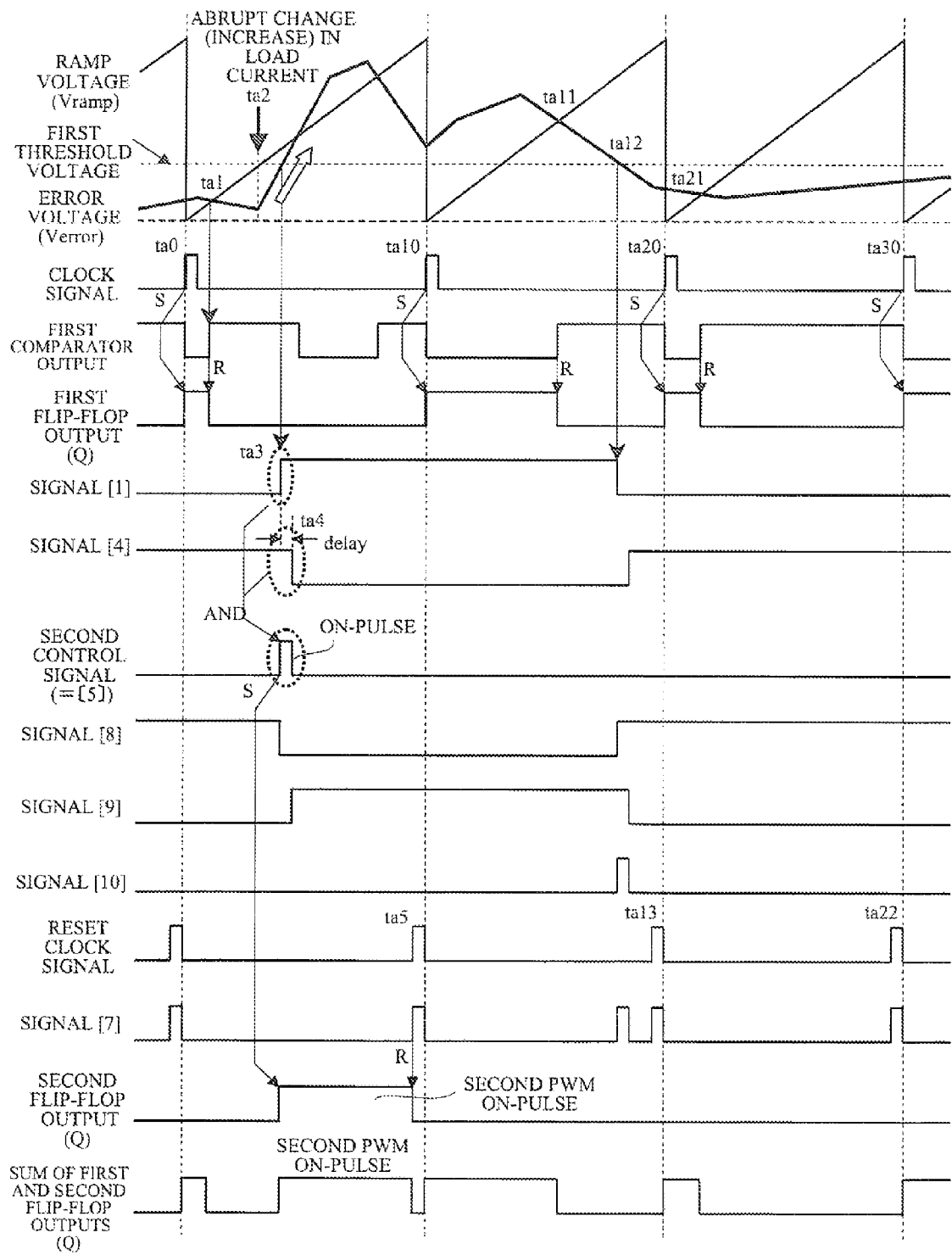
FIG. 2 is a timing waveform diagram (in a case of intermediate current) for describing the operation inside the semiconductor device shown in FIG. 1.
Figure 3:
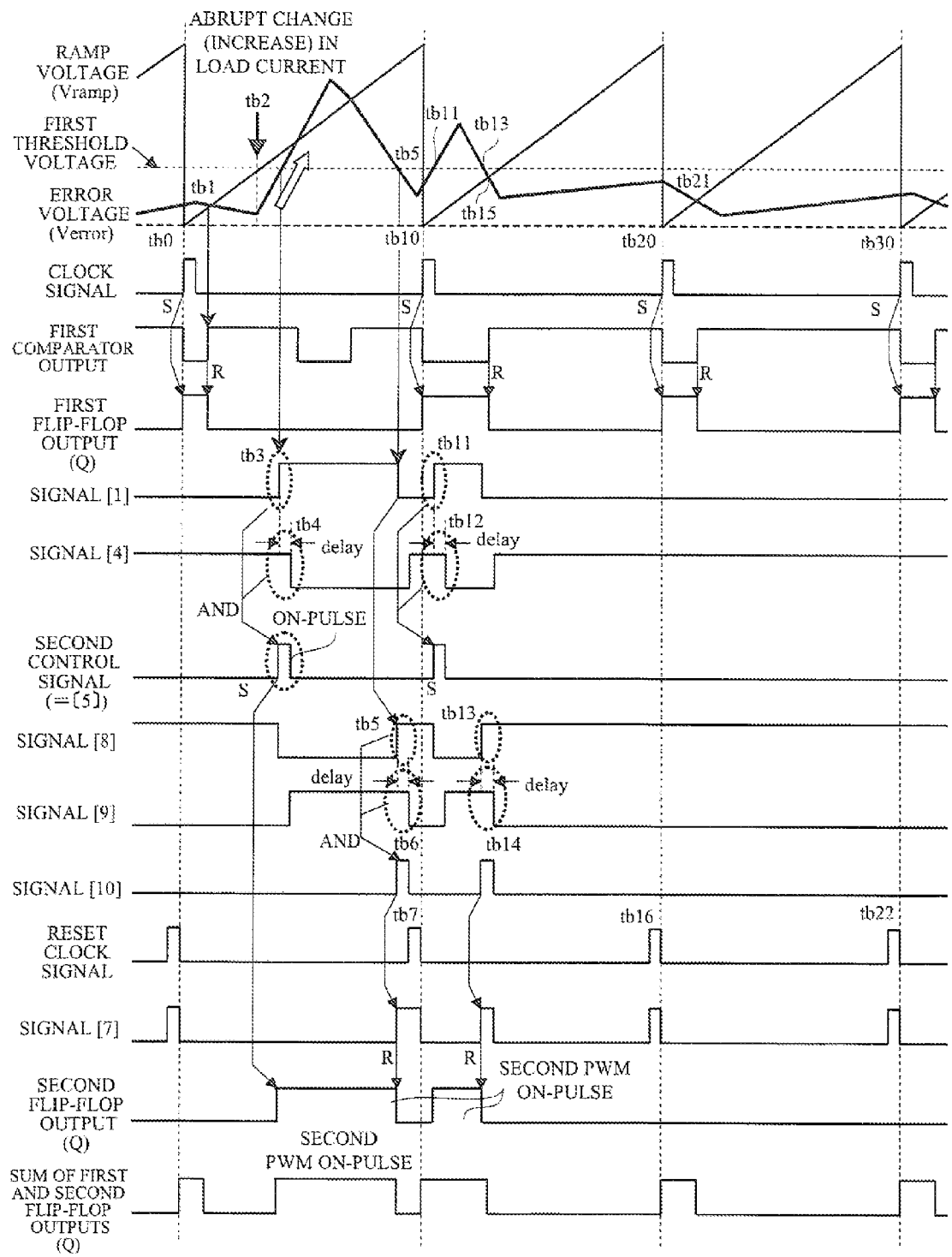
FIG. 3 is a timing waveform diagram (in a case of large current) for describing the operation inside the semiconductor device shown in FIG. 1.
Figure 4:
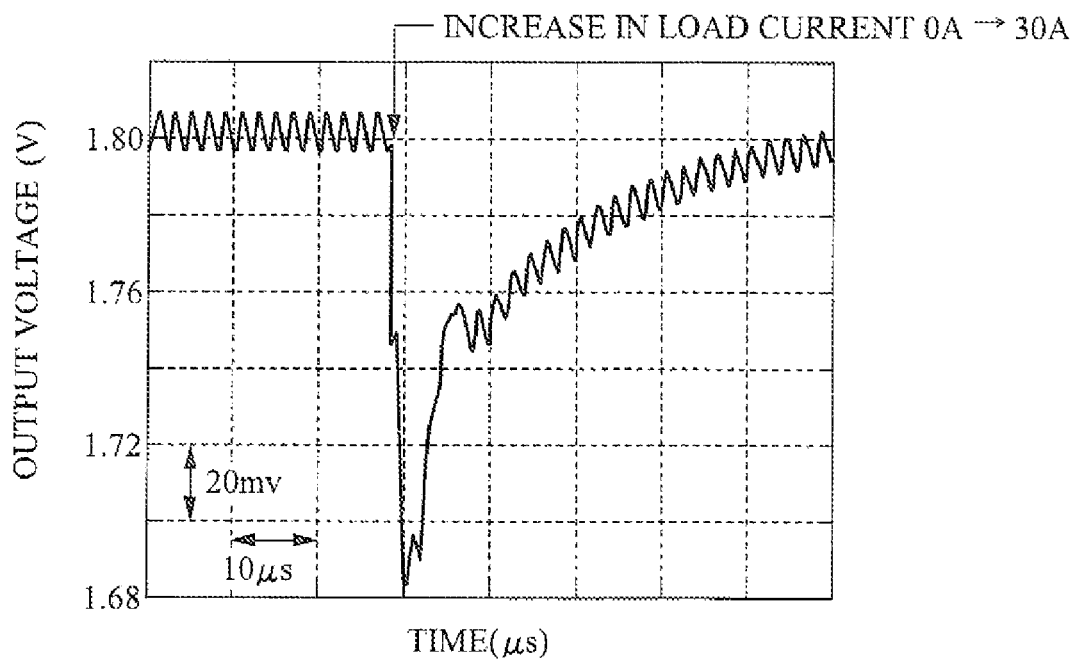
FIG. 4 is a drawing of simulation waveforms at the time of fluctuations of a load current of a power supply using a conventional semiconductor device.
Figure 5:
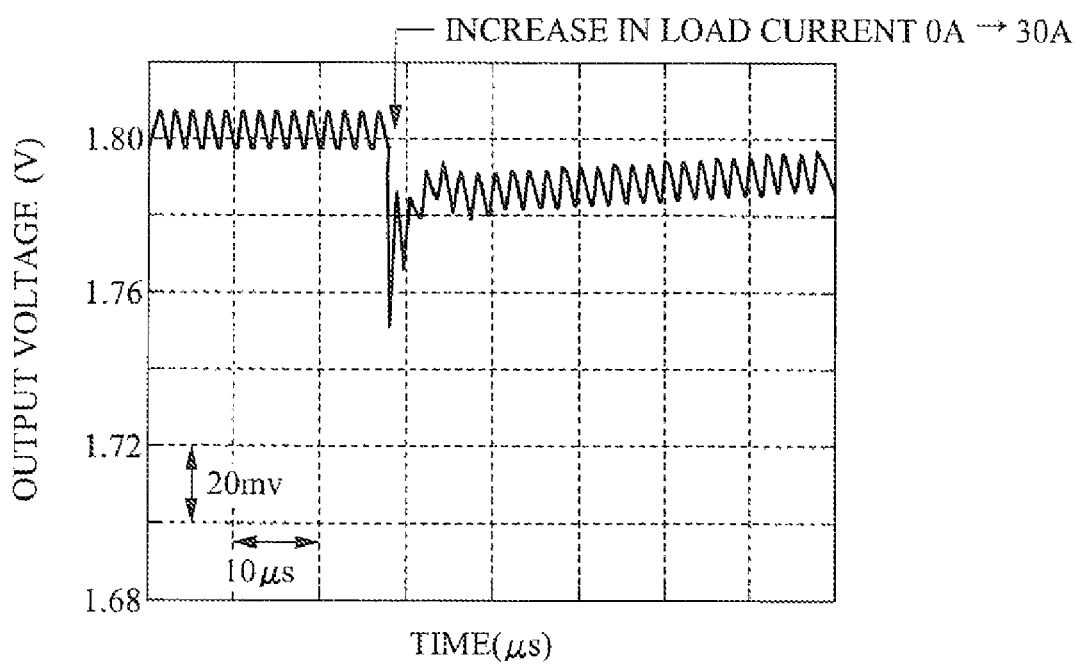
FIG. 5 is a drawing of simulation waveforms at the time of fluctuations of a load current of a power supply using a semiconductor device of the present invention.
Figure 18:
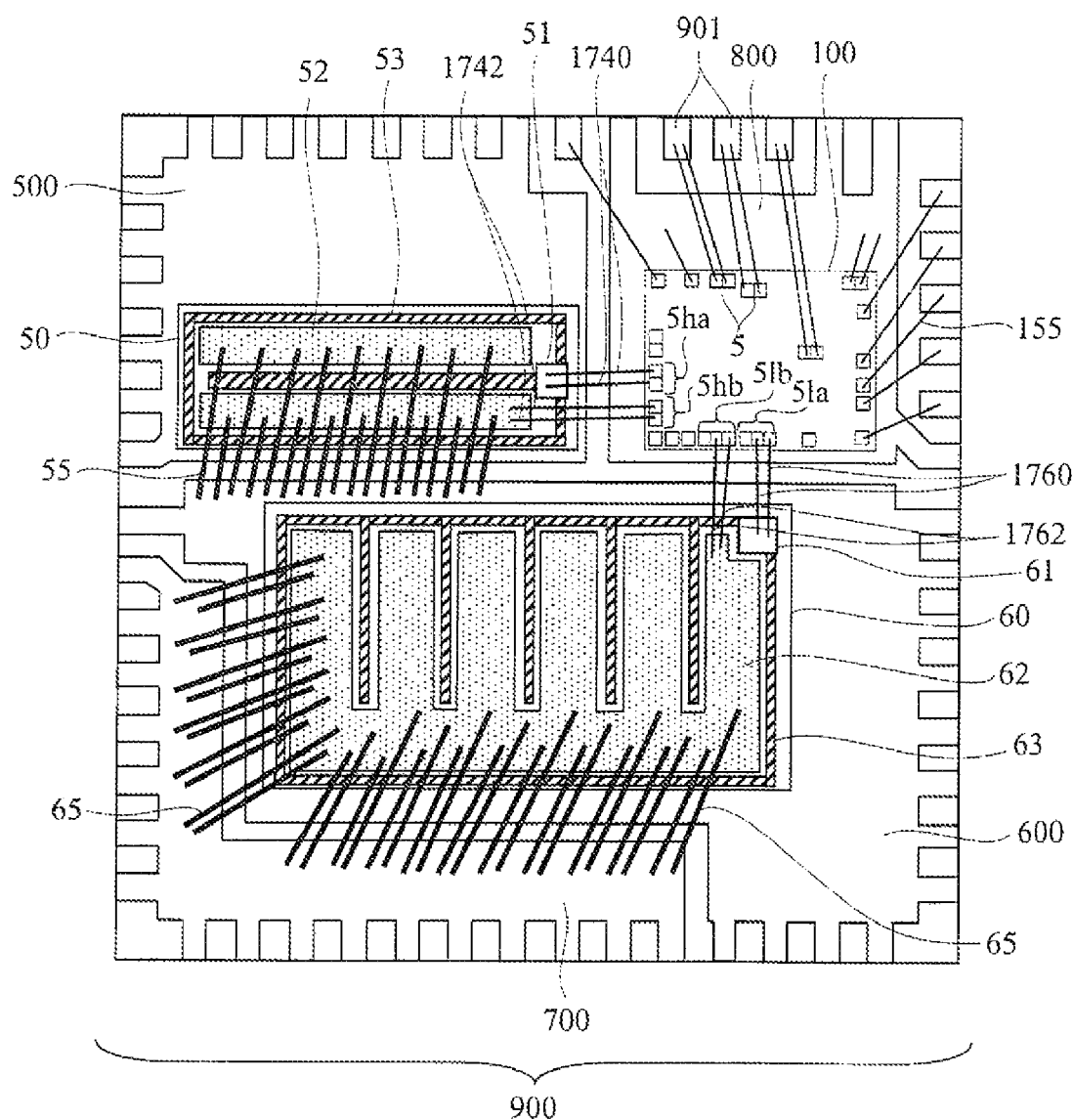
FIG. 18 is a plan view of a multi-chip module viewed through a sealing material on the surface, in which the semiconductor device and one power MOSFET according to the first embodiment of the present invention are mounted in one package.

A first embodiment of the present invention will be described with reference to FIG. 1 to FIG. 5 and FIG. 18. FIG. 1 is a circuit block diagram of a semiconductor device and a power supply using the same according to the first embodiment of the present invention. FIG. 2 and FIG. 3 are timing waveform diagrams for describing the operation inside the semiconductor device shown in FIG. 1. FIG. 4 shows simulation waveforms of a power supply using a conventional semiconductor device at the time of fluctuations of a load current. FIG. 5 shows simulation waveforms of the power supply using the semiconductor device according to the first embodiment of the present invention at the time of fluctuations of a load current. FIG. 18 is a plan view of a multi-chip module viewed through a sealing material on the surface, in which the semiconductor device and the power MOSFET according to the first embodiment of the present invention are implemented in one package.

In FIG. 1, a power supply (switching power supply) 10 using the semiconductor device according to the first embodiment of the present invention includes a power-supply control IC 100 that performs pulse width modulation (PWM) control, a high-side power MOSFET 50 for control, a low-side power MOSFET 60 for synchronization, an input capacitor (not shown), a choke coil 70, and an output capacitor 80, and the power supply 10 supplies a constant voltage to a load circuit 90.

The power-supply control IC 100, the high-side power MOSFET 50, and the low-side power MOSFET 60 are semiconductor chips electrically connected to each other and are contained in one package.

The power-supply control IC 100 supplies a signal for controlling the period in which the power MOSFETs 50 and 60 are in an ON state (ON time) to the gate of each power MOSFET. This power-supply control IC 100 is a power-supply control circuit including the semiconductor circuit, which is a feature of the present invention, and is characterized in a method of generating a PWM control signal at the time when the load current is abruptly changed. Details thereof will be described further below.

Figure 16A:
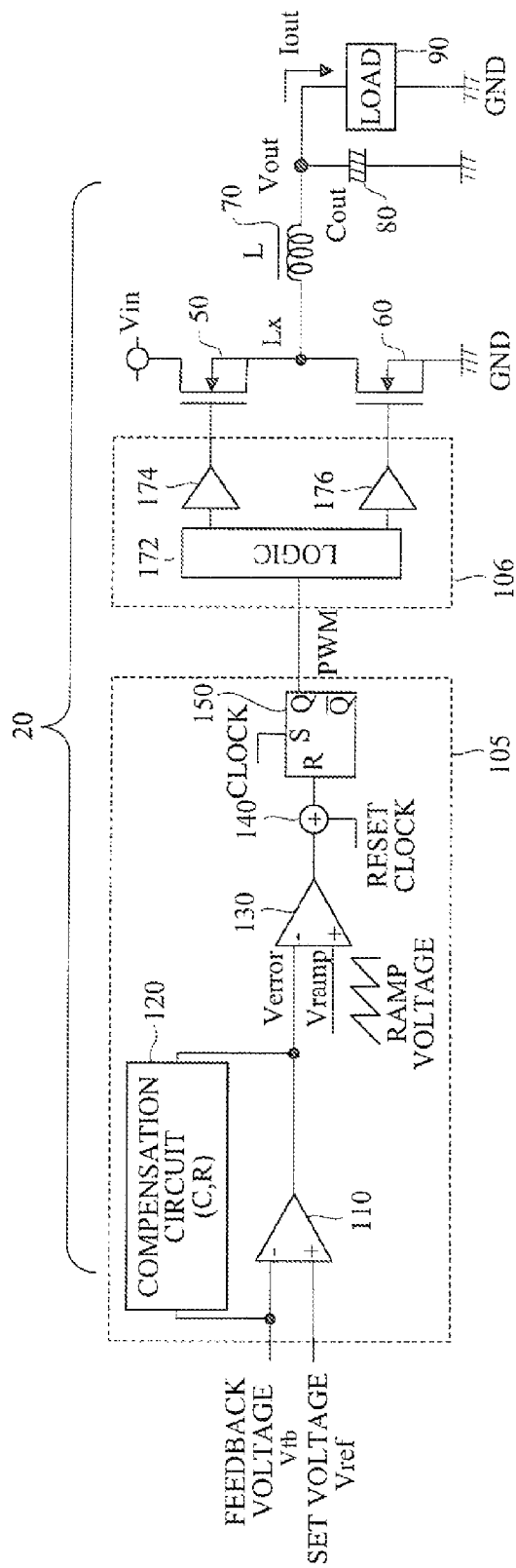
FIG. 16A is a circuit block diagram of a conventional semiconductor device and a power supply using the same.
Figure 16B:
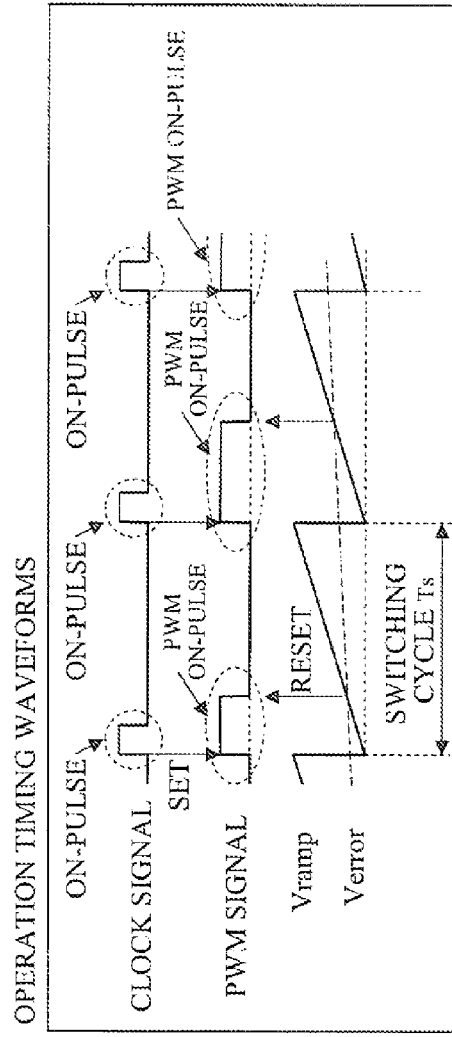
FIG. 16B is a timing waveform diagram for briefly describing an operation.

Meanwhile, a circuit block diagram of a conventional power supply 20 is shown in FIG. 16A, and a timing waveform diagram for briefly describing an operation of the power supply 20 is shown in FIG. 16B. 105 denotes a power-supply control IC and 106 denotes a driver IC. These ICs 105 and 106 may be formed of separate semiconductor chips, or may be collectively mounted on one chip to be a power-supply control IC. When a clock signal entering a set signal input (S) of a first flip-flop circuit 150 becomes an on-pulse (in the present specification, the "on-pulse" is defined as a pulse signal in which a voltage level of the signal rises from a low level to a high level and then returns to the low level after a predetermined time), a PWM on-pulse is generated at its rising edge. Then, the generated PWM on-pulse ends as follows. A difference voltage between a feedback voltage Vfb and an output set voltage Vref is amplified by an error amplifier 110, an error voltage Verror which is the output of the error amplifier 110 is compared with a ramp voltage Vramp by a first comparator circuit 130, and an output signal thereof enters a reset signal input (R) of the first flip-flop circuit 150. At the time when the ramp voltage Vramp exceeds the error voltage Verror, the output signal of the first comparator circuit 130 becomes a high level, the first flip-flop circuit 150 is reset to end the PWM on-pulse. Once the PWM on-pulse ends, no PWM on-pulse is generated until the next switching cycle in which the clock signal becomes an on-pulse.

The operation of a step-down switching power supply using PWM control will be briefly described. It is assumed herein that the load circuit 90 consumes a constant current Iout.

While the PWM on-pulse is being generated, the high-side power MOSFET 50 is in an ON state, in which a current flows into the choke coil 70 via a terminal of an input voltage Vin from a DC power supply on an input side (not shown) to supply a current to the load circuit 90. At this time, the low-side power MOSFET 60 is in an OFF state.

When the PWM on-pulse ends, the high-side power MOSFET 50 is turned off, but the current continues to flow with the energy accumulated in the choke coil 70 and the output capacitor 80, and a freewheel current flows from a ground (GND) end side to an Lx side via a built-in diode (not shown) of the low-side power MOSFET 60. After a dead-time period in which the high-side and low-side power MOSFETs 50 and 60 are both in an OFF state, the low-side power MOSFET 60 is turned on. Then, the freewheel current continues to flow inside the low-side power MOSFET 60.

Immediately before a PWM on-pulse is generated again, dead-time period in which the high-side and low-side power MOSFETs 50 and 60 are both in an OFF state occurs again, and then a PWM on-pulse of the next switching cycle is generated.

If a load current Iout is constant, the output voltage Vout appearing at the load circuit 90 has a value obtained by multiplying the input voltage Vin by a ratio between the on-period of the PWM on-pulse and the switching cycle. However, if the load current Iout is abruptly increased, the current cannot be supplied in time, and the output voltage decreases. Consequently, the error voltage Verror obtained by amplifying the difference voltage between the feedback voltage obtained by converting the output voltage Vout with a predetermined ratio via a voltage-dividing resistance and the output set voltage Vref is increased. Then, a time until the ramp voltage Vramp exceeds the error voltage Verror is also increased, and an on-period of the PWM on-pulse is extended. As a result, the on-time of the high-side power MOSFET 50 is also extended, and the amount of current supply is increased to suppress the voltage decrease. However, if a voltage change is large, ten and several to several tens of switching cycles are required until the voltage turns back.

Figure 17:
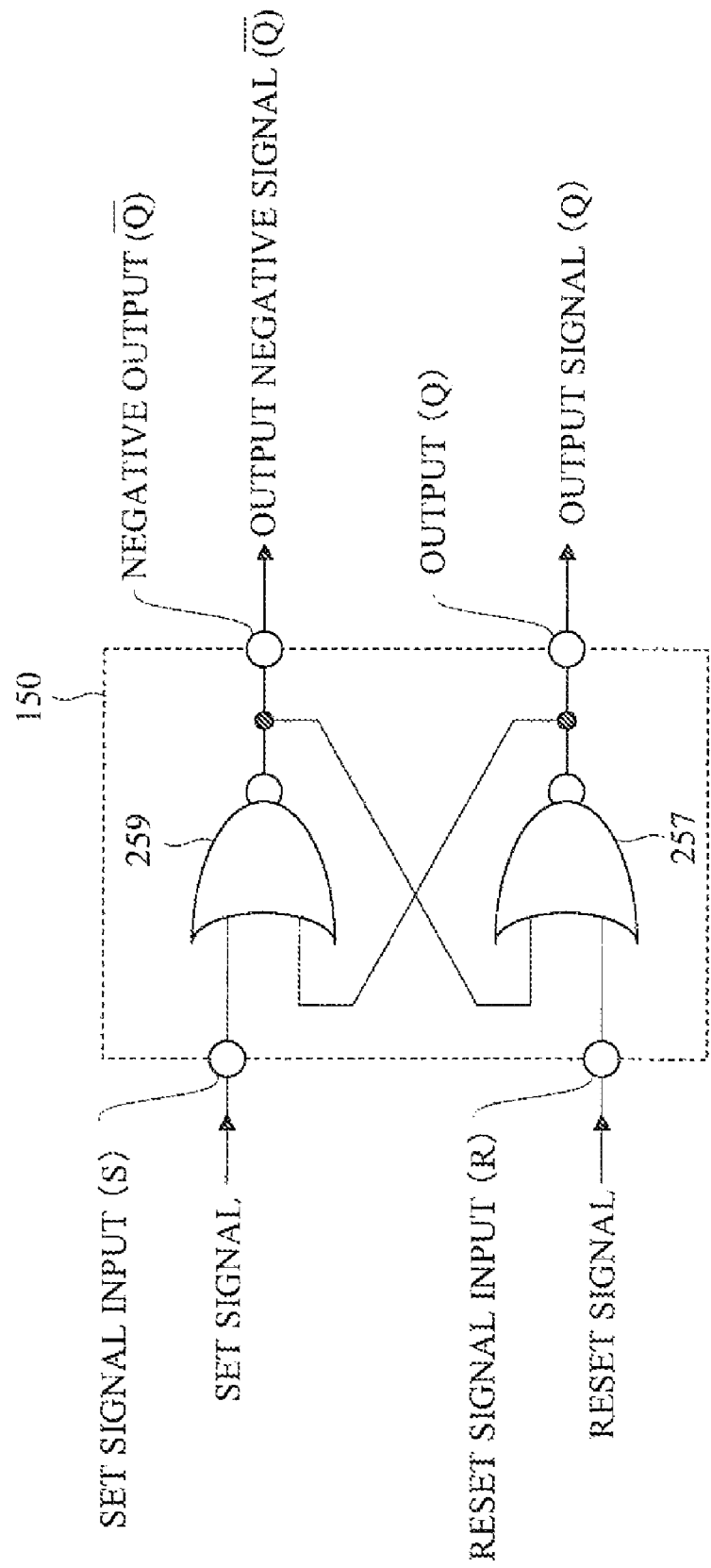
FIG. 17 is an internal circuit diagram of a flip-flop circuit used in the semiconductor device shown in FIG. 16.

FIG. 17 shows a configuration example of an internal circuit of the first flip-flop circuit 150. The circuit includes two negative-OR (NOR) circuits 257 and 259, and an output signal from each NOR circuit is an input signal to the other NOR circuit.

The circuit block diagram of the conventional power supply 20 and a timing waveform diagram of the operation thereof have been described above. In the following, returning to the description of FIG. 1, the power-supply control IC 100 constituting the power supply 10 according to the first embodiment will be described in detail.

The power-supply control IC 100 according to the first embodiment includes an error amplifier 110, an output-voltage setting circuit 112, a compensation circuit 120, a first comparator circuit 130, adders 140 and 160, a first flip-flop circuit 150, a driver circuit 170, and a second PWM on-pulse generation circuit 200.

The output-voltage setting circuit 112 is a circuit that determines a set voltage Vref of a power-supply output and includes a register. For example, the output-voltage setting circuit 112 takes a set value from a personal computer or the like via a communication line 302 and retains it in a register.

The driver circuit 170 includes a logic circuit 172 in which a PWM control signal is input, a gate drive circuit 174 of the high-side power MOSFET 50, and a gate drive circuit 176 of the low-side power MOSFET 60.

The second PWM on-pulse generation circuit 200 includes a second comparator circuit 210 that compares the error voltage Verror and a first threshold voltage, delay circuits 224 and 266, inverter circuits 222, 262 and 264, a first AND circuit 220, a second AND circuit 260, a first OR circuit 258, a second flip-flop circuit 250, a first-threshold-voltage setting circuit 290, and a communication interface 300.

A set-purpose first-on-pulse generation circuit for setting the second flip-flop circuit 250 is formed of the first AND circuit 220, the inverter circuit 222 and the delay circuit 224, and an output signal thereof (second control signal [5]) enters a set signal input (S) of the second flip-flop circuit 250. Also, a reset-purpose first on-pulse generation circuit for resetting the second flip-flop circuit 250 is formed of the second AND circuit 260, the inverter circuit 264 and the delay circuit 266, and a signal (signal [7]) obtained by the logical OR between an output signal thereof and a reset clock signal enters a reset signal input (R) of the second flip-flop circuit 250. Then, an output signal from the second flip-flop circuit 250 enters the adder 160.

The communication interface 300 is an interface circuit supporting the PMBus which is an open-standard digital power-supply control protocol, and the interface 300 takes the values of the power-supply-output set voltage Vref and the first threshold voltage from a personal computer through the communication line 302 and writes these values in each register.

Since the second PWM on-pulse generation circuit 200 is provided, when the load current is abruptly changed after the end of the first PWM on-pulse generated in synchronization with rising of the clock signal, a second PWM on-pulse can be generated again within the same switching cycle. Since it is possible to generate the PWM on-pulse without waiting until the next switching cycle, the decrease of the output voltage due to fluctuations of the load current can be suppressed.

The internal operation of the second PWM on-pulse generation circuit 200 will be described with reference to FIG. 2 and FIG. 3. FIG. 2 and FIG. 3 are drawings schematically showing the timing waveforms for describing the operation inside the semiconductor device shown in FIG. 1, in which FIG. 3 shows the case where a change in current is smaller compared to that in FIG. 2.

In FIG. 2, when a clock signal becomes an on-pulse at a time ta0, the output voltage (Q) of the first flip-flop circuit 150 becomes a high level, and a first PWM on-pulse is generated. At the same time, a ramp voltage Vramp starts to increase, and when the ramp voltage Vramp exceeds an error voltage Verror at a time ta1, the output voltage of the first comparator circuit 130 becomes a high level. Therefore, the output signal (Q) of the first flip-flop circuit 150 returns to a low level again, and the first PWM on-pulse ends. After the end of the first PWM on-pulse, when an abrupt change (increase) of a load current occurs at a time ta2, the error voltage Verror is increased, and when it exceeds a first threshold voltage at a time ta3, the voltage of an output signal (signal [1]) of the second comparator circuit 210 becomes a high level. Then, since its inverted delay signal (signal [4]) becomes a low level at a time ta4 after a predetermined delay, an output signal (second control signal) of the first AND circuit 220 becomes an on-pulse. Upon the rising of this on-pulse, the output voltage (Q) of the second flip-flop circuit 250 becomes a high level, and a second PWM on-pulse is generated. The second PWM on-pulse is input to the driver circuit 170 via the adder 160. At a time ta5, a reset clock signal becomes an on-pulse, and it enters a reset signal input (R) of the second flip-flop circuit 250. Therefore, the output signal of the second flip-flop circuit 250 returns to a low level, and the second PWM on-pulse ends.

In the next switching cycle, the clock signal rises to a high level at a time ta10 and a first PWM on-pulse is generated, and since the ramp voltage Vramp exceeds the error voltage Verror at a time ta11, the first PWM on-pulse ends. After the second PWM on-pulse is generated in the previous switching cycle, the next second PWM on-pulse is not generated in the second PWM on-pulse generation circuit 200 unless the error voltage Verror once returns to a voltage lower than the first threshold voltage. Therefore, although the error voltage Verror exceeds the first threshold voltage at the end of the first PWM on-pulse, no second PWM on-pulse is generated. The error voltage Verror becomes lower than the first threshold voltage at a time ta12, and the voltage of the output signal (signal [1]) of the second comparator circuit 210 returns to a low level.

Note that, in the description of operation timings, with regard to the times used in FIG. 2, the delay times in the comparator and the logic circuit are neglected for the simplification of the description. Also, arrows extending downward at the timings of changes (rising and falling) of the signals in the drawing represent that a change of a signal on a foot side of the arrow causes a change of a signal on a head side of the arrow. The same goes for other timing waveform diagrams for describing the operation.

In FIG. 3, the generation and end of the first PWM on-pulse and the generation of the second PWM on-pulse are similar to those in FIG. 2. However, since a change in current is small compared with FIG. 2, the error voltage Verror falls below the first threshold voltage at a time tb5 in a switching cycle where the second PWM on-pulse is generated. At the time tb5, the voltage of the output signal (signal [1]) of the second comparator circuit 210 returns to a low level. Accordingly, the voltage of an inverted signal (signal [8]) of the signal [1] becomes a high level at the time tb5, and an inverted signal thereof (signal [9]) returns to a low level at a time tb6 after a predetermined delay. Therefore, the second AND circuit 260 outputs an on-pulse for reset (at times tb5 to tb6 of the signal [10]). As a result, the second PWM on-pulse ends before a time tb7 when the reset clock signal generates an on-pulse.

In the next switching cycle, the clock signal rises to a high level at a time tb10 and a first PWM on-pulse is generated. Also, at a time tb15, the ramp voltage Vramp exceeds the error voltage Verror, and the first PWM pulse ends.

Concurrently, the error voltage Verror exceeds the first threshold voltage at a time tb11, and the voltage of the output signal (signal [1]) of the second comparator circuit 210 becomes a high level. Then, since the inverted delay signal thereof (signal [4]) becomes a low level at a time tb12 after a predetermined delay, an output signal (second control signal)

of the first AND circuit 220 becomes an on-pulse (times tb11 to tb12). Upon the rising of this on-pulse, the output voltage (Q) of the second flip-flop circuit 250 becomes a high level and a second PWM on-pulse is generated. Then, at a time tb13, the error voltage Verror becomes lower than the first threshold voltage. Therefore, at a time tb13, the voltage of the signal [8] becomes a high level, and the inverted delay signal thereof (signal [9]) returns to a low level at a time tb14 after a predetermined delay. Thus, the second AND circuit 260 outputs an on-pulse for reset. Since this on-pulse enters a reset signal input (R) of the second flip-flop circuit 250, the output signal (Q) of the second flip-flop circuit 250 returns to a low level and the second PWM on-pulse ends. In this case, since the second PWM on-pulse is within a period of generating the first PWM on-pulse, the driver circuit 170 is controlled by the first PWM on-pulse.

As shown in the description of the operation timing waveforms above, in the semiconductor device according to the first embodiment, when the error voltage Verror exceeds the first threshold voltage, the set signal input to the flip-flop circuit becomes an on-pulse, and the second PWM on-pulse is generated from an output of the flip-flop circuit. Then, when the error voltage Verror becomes lower than the first threshold voltage or when the reset clock signal for forcibly ending the second PWM on-pulse becomes an on-pulse, the reset signal input to the flip-flop circuit becomes an on-pulse and the generation of the second PWM on-pulse ends.

Effects of the power supply using the semiconductor device according to the first embodiment will be described with reference to FIG. 4 and FIG. 5. These drawings show simulation results of operation waveforms at the time of load fluctuations of the power supply, in which FIG. 4 shows the case of using a conventional semiconductor device and FIG. 5 shows the case of using the semiconductor device according to the first embodiment. Conditions for this power-supply simulation are: an input voltage of 12 V; an output voltage of 1.8 V; an output current of 30 A; a choke coil of 320 nH; an output capacitor of 600 µF; and fluctuation of a load current of 100 A/µs.

In the case of using the conventional semiconductor device, as shown in FIG. 4, a decrease of output voltage after an increase of the load current is approximately 115 mV, and a decrease of output voltage in the case of using the semiconductor device according to the present invention is approximately 50 mV, which is smaller than half of the decrease in the case of using the conventional semiconductor device as shown in FIG. 5.

Next, an example of the case where the semiconductor device according to the first embodiment is applied to a power supply will be described. FIG. 18 is a drawing showing a multi-chip module 900 in which the power-supply control IC 100, the high-side power MOSFET 50 and the low-side power MOSFET 60 are mounted in one package.

On an input side plate lead portion 500, which is a first plate conductive member in the multi-chip module 900, the high-side power MOSFET 50 for control is electrically connected. More specifically, on the rear side (not shown) of the high-side power MOSFET 50 for control, a terminal portion (not shown) to be a drain terminal of the high-side power MOSFET 50 for control is formed, and the input side plate lead portion 500 is connected to this drain terminal via a die bonding material such as silver paste, for example.

On the other hand, on a main surface (front surface) having a gate terminal 51 of the high-side power MOSFET 50 for control, terminal portions to be a source terminal 52 and a gate terminal 51 and a gate finger 53 of the high-side power MOSFET 50 for control are formed.

Also, on an output side plate lead portion 600, which is a second plate conductive member, the low-side power MOSFET 60 for synchronization is electrically connected. More specifically, on the rear side (not shown) of the low-side power MOSFET 60 for synchronization, a terminal portion (not shown) to be a drain terminal of the low-side power MOSFET 60 for synchronization is formed, and the output side plate lead portion 600 is connected to this drain terminal via a die bonding material such as silver paste, for example.

On the other hand, on a main surface (front surface) having a gate terminal 61 of the low-side power MOSFET 60 for synchronization, terminal portions to be a source terminal 62 and a gate terminal 61 and a gate finger 63 of the low-side power MOSFET 60 for synchronization are formed.

Also, the multi-chip module 900 has a power-supply-control-IC side plate lead portion 800 which is a third plate conductive member and a ground side plate lead portion 700 which is a fourth plate conductive member, and the power-supply control IC 100 is electrically connected on the power-supply-control-IC side plate lead portion 800. More specifically, an electrode is formed on the rear surface of the power-supply control IC 100 (not shown), and this electrode and the power-supply-control-IC side plate lead portion 800 are connected via a die bonding material such as silver paste, for example.

The power-supply control IC has a plurality of terminals 5 on its main surface (front surface). Also, of these terminals 5, a terminal 51a is electrically connected to the gate terminal 61 of the low-side power MOSFET 60 for synchronization via wires 1760, a terminal 51b is electrically connected to the source terminal 62 of the low-side power MOSFET 60 for synchronization via wires 1762, a terminal 5ha is electrically connected to the gate terminal 51 of the high-side power MOSFET 50 for control via wires 1740, and a terminal 5hb is electrically connected to the source terminal 52 of the high-side power MOSFET 50 for control via wires 1742, respectively. These wires 1760, 1762, 1740 and 1742 are metal fine wires such as gold wires, and these terminals are used for ON/OFF control of each power MOSFET.

The other terminals 5 on the main surface of the power-supply control IC 100 include a power-supply voltage terminal, a boot terminal, a terminal for voltage check, and a control signal input terminal, and they are connected to corresponding external connection terminals 901 via wires 155.

Furthermore, as for the electrical connecting relation, the input side plate lead portion 500 corresponds to the input voltage Vin terminal of FIG. 1, and an input voltage Vin is applied thereto. Also, as described above, the input side plate lead portion 500 is electrically connected to the drain terminal (not shown) of the high-side power MOSFET 50 via the die bonding material.

The output side plate lead portion 600 corresponds to an Lx terminal of FIG. 1, and it is electrically connected to the source terminal 52 of the high-side power MOSFET 50 via wires 55 and also connected to the drain terminal (not shown) of the low-side power MOSFET 60 via the die bonding material as described above.

The ground side plate lead portion 700 corresponds to the ground GND terminal of FIG. 1, and it is electrically connected to the source terminal 62 of the low-side power MOSFET 60 via wires 65.

In the description of the first embodiment, the case where, in the second PWM on-pulse generation circuit 200, the error voltage Verror and the first threshold voltage are compared with each other by the second comparator circuit 210 has been described, but this is not meant to be restrictive. For example, in place of the error voltage Verror, a) the output voltage Vout, b) the feedback voltage Vfb obtained by converting the output voltage Vout at a predetermined ratio via the voltage-dividing resistance, or c) a difference voltage between the feedback voltage Vfb and the output set voltage Vref may be compared with the first threshold voltage by the second comparator circuit 210. In this case, it is needless to say that the value of the first threshold voltage is varied depending on the type of the target voltage for comparison. Also, the above replacement can be applied to the following embodiments.

Therefore, according to the first embodiment, when the voltage is dropped due to an abrupt change of the load current after the end of the PWM on-pulse and the error voltage exceeds the predetermined threshold voltage, a second PWM on-pulse is generated within the same switching cycle, thereby suppressing fluctuations of the power-supply voltage at the time when the load current is abruptly changed. Thus, a stabilized DC voltage can be supplied to the load.

Second Embodiment

Figure 6:
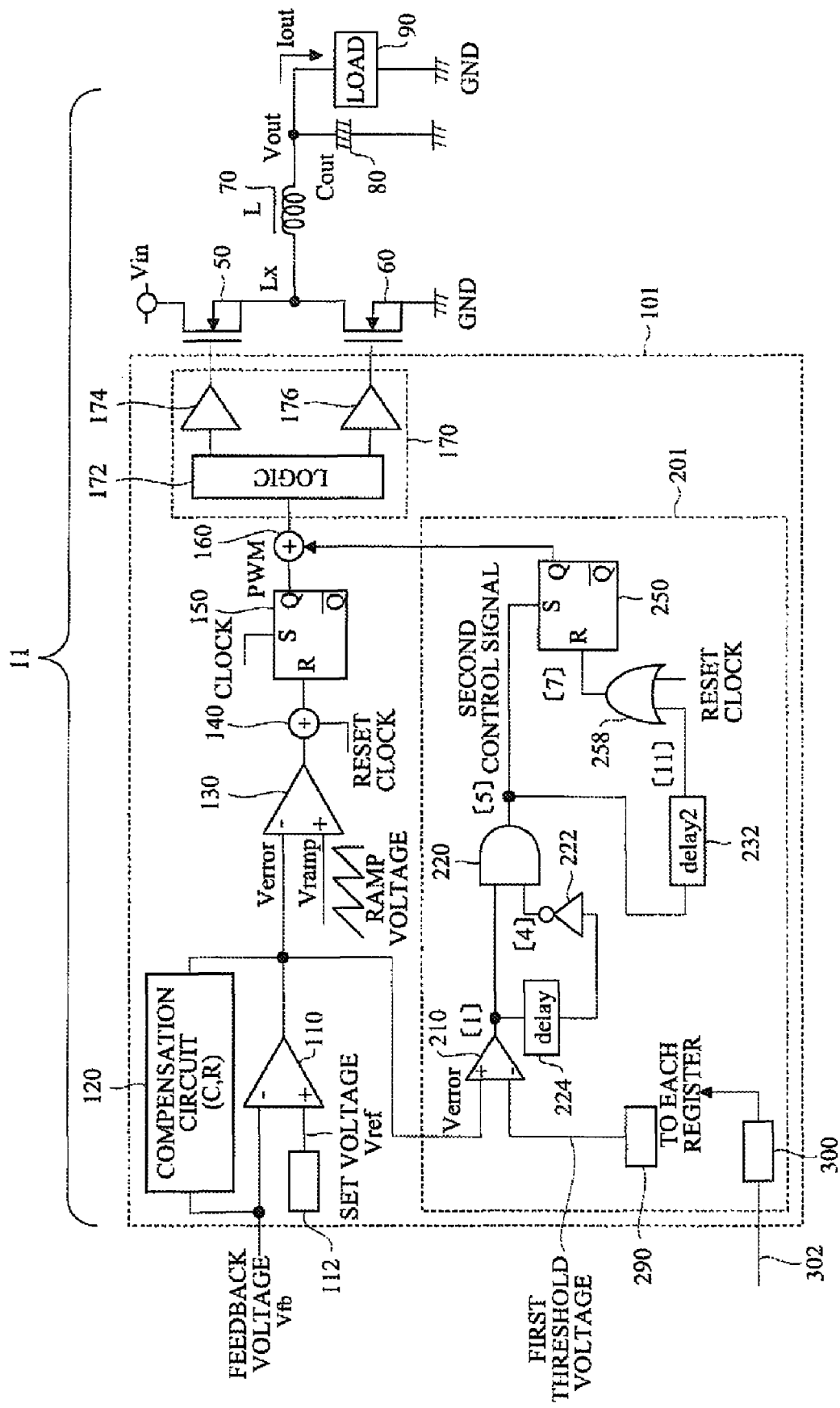
FIG. 6 is a circuit block diagram of a semiconductor device and a power supply using the same according to a second embodiment of the present invention.
Figure 7:
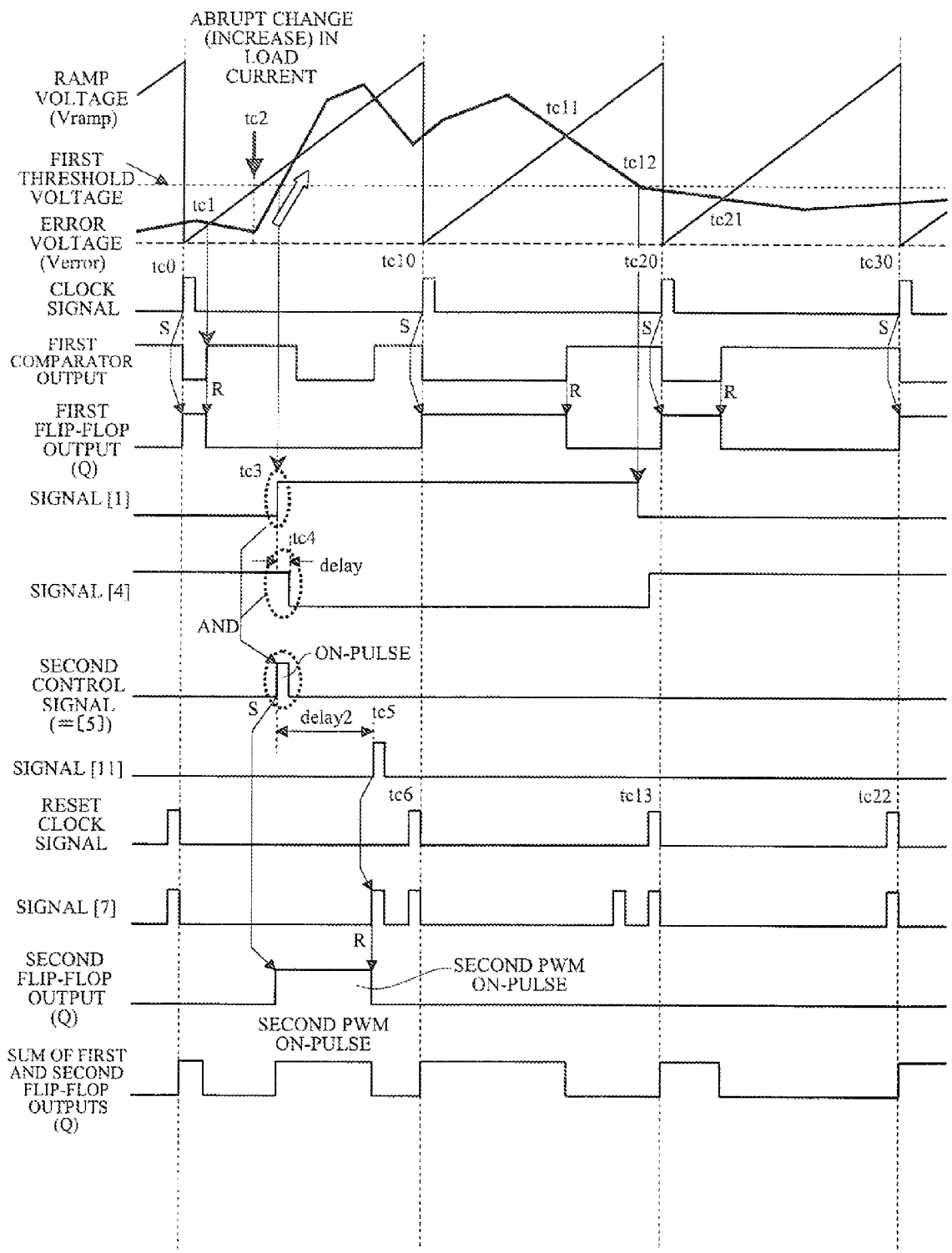
FIG. 7 is a timing waveform diagram for describing the operation inside the semiconductor device shown in FIG. 6.

A second embodiment of the present invention will be described with reference to FIG. 6 and FIG. 7. FIG. 6 is a circuit block diagram of a semiconductor device and a power supply using the same according to the second embodiment of the present invention. FIG. 7 is a drawing schematically showing the timing waveforms for describing the operation inside the semiconductor device shown in FIG. 6.

The difference between a power supply 11 of the second embodiment and that of the first embodiment lies in that the end of the second PWM on-pulse is determined by the delay time of a delay circuit 232 (delay2). Therefore, in the second embodiment, as shown in FIG. 6, in a second PWM on-pulse generation circuit 201 of a power-supply control IC 101, a sum signal of a reset clock signal and a signal obtained by delaying an on-pulse output from the first AND circuit 220 by a predetermined time at the delay circuit 232 is input to a reset signal input (R) of the second flip-flop circuit 250. The reason why a logical sum with the reset clock signal is taken instead of the delay time set by the delay circuit 232 is that, if an abrupt change (increase) of the load current occurs in the latter half of the switching cycle, the reset timing may be in the next switching cycle. Even in such a case, by taking the logical sum with the reset clock signal, the second PWM on-pulse can be forcibly ended immediately before the end of the switching cycle.

In FIG. 7, the generation and the end of the first PWM on-pulse and the generation of the second PWM on-pulse are similar to those in FIG. 2. However, the timing of the end of the second PWM on-pulse differs. At a time tc5 after a delay time delay2 from the generation of the on-pulse of the second control signal (=signal [5]) (time tc3), an on-pulse appears in a signal [11] and enters a reset signal input of the second flip-flop circuit 250 via the first OR circuit 258, and the second PWM on-pulse ends. The operation in the next and subsequent switching cycles is the same as that in FIG. 2.

Therefore, in the second embodiment, in addition to the effects of the first embodiment, since the delay time of the delay circuit 232 can be set in accordance with the application of the power supply, the flexibility of a power-supply design can be increased.

Third Embodiment

Figure 8:
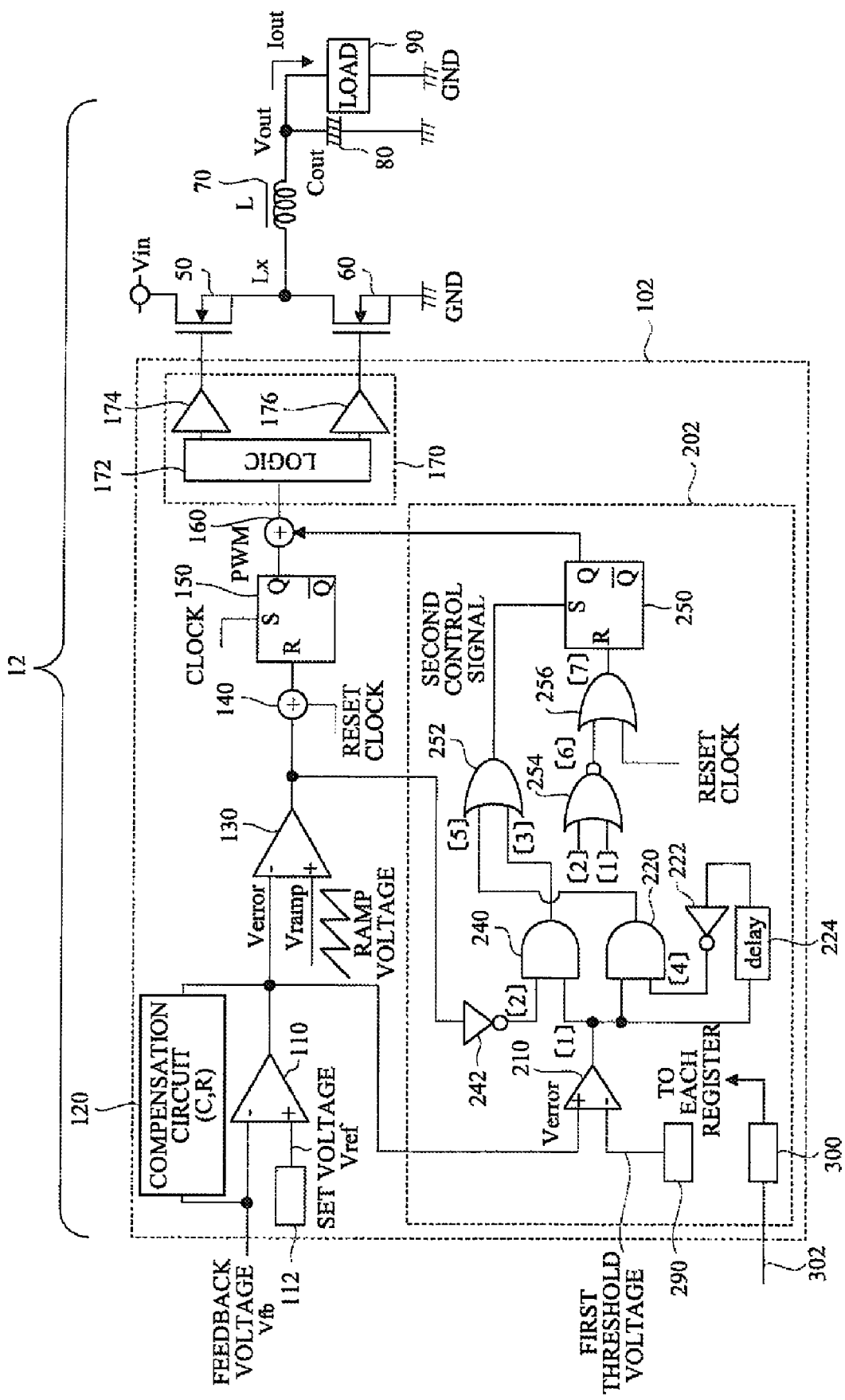
FIG. 8 is a circuit block diagram of a semiconductor device and a power supply using the same according to a second embodiment of the present invention.
Figure 9:
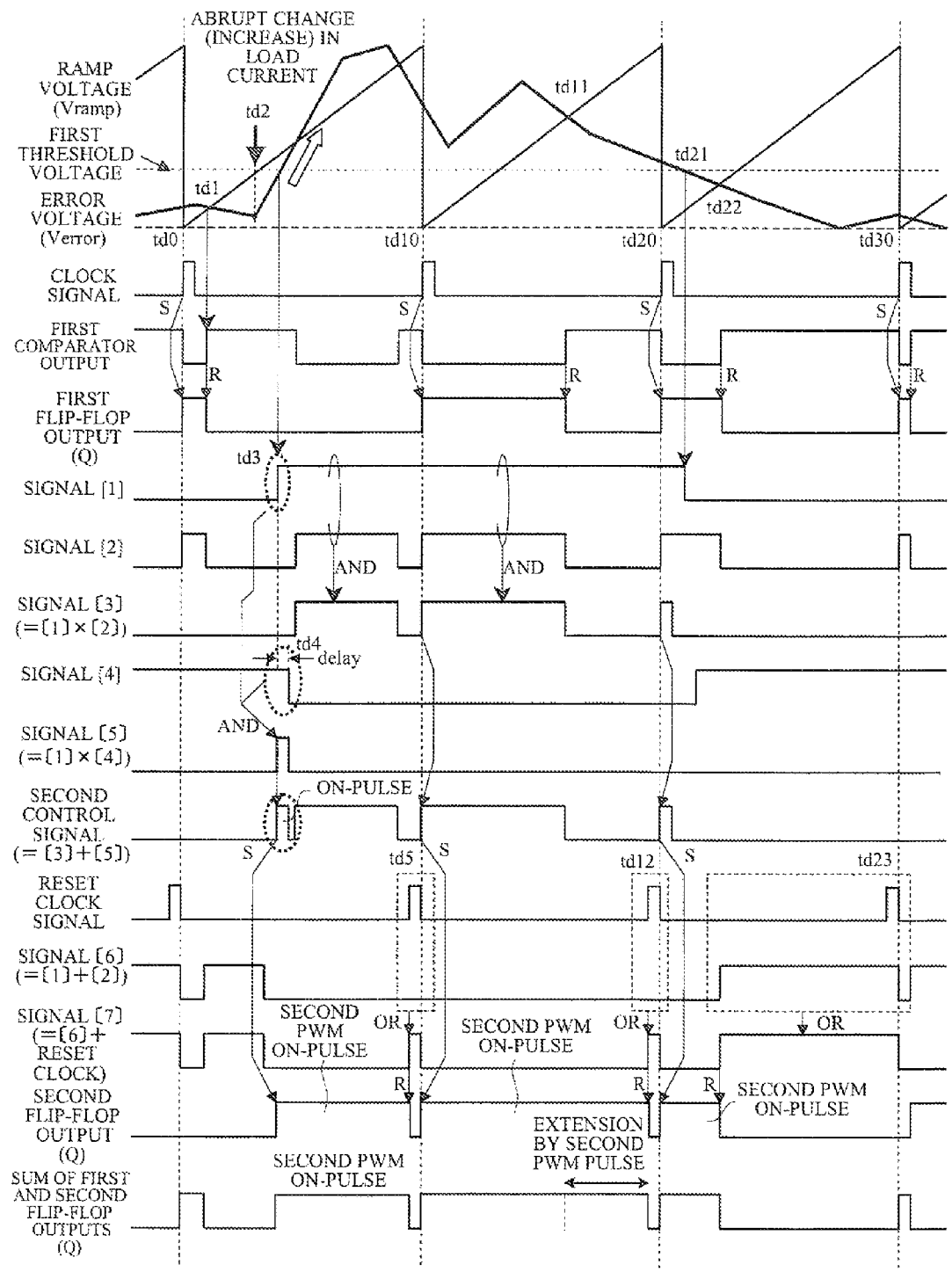
FIG. 9 is a timing waveform diagram for describing the operation inside the semiconductor device shown in FIG. 8.

A third embodiment of the present invention will be described with reference to FIG. 8 and FIG. 9. FIG. 8 is a circuit block diagram of a semiconductor device and a power supply using the same according to the third embodiment of the present invention. FIG. 9 is a drawing schematically showing the timing waveforms for describing the operation inside the semiconductor device shown in FIG. 8.

The difference between a power supply 12 of the third embodiment and that of the first embodiment lies in that the second PWM on-pulse can be generated any time in synchronization with the falling of the output voltage of the first comparator circuit 130 as long as the error voltage Verror exceeds the first threshold voltage, except for an on-pulse period of the reset clock signal. Therefore, in the third embodiment, as shown in FIG. 8, in the second PWM on-pulse generation circuit 202 of the power-supply control IC 102, the configuration of each on-pulse generation circuit for setting and resetting the second flip-flop circuit 250 is different from that of the first embodiment.

As an on-pulse generation circuit for setting the second flip-flop circuit 250, in addition to the set-purpose first on-pulse generation circuit constituted of the first AND circuit 220, the inverter circuit 222, and the delay circuit 224 described in the first embodiment, a third AND circuit 240 that receives inputs of a signal (signal [2]) obtained by inverting the output signal of the first comparator circuit 130 and an output signal (signal [1]) of the second comparator circuit 210 is provided as a set-purpose second on-pulse generation circuit, and a logical sum of an output signal [signal [5]] of the set-purpose first on-pulse generation circuit and an output signal (signal [3]) of the set-purpose second on-pulse generation circuit is used as a second control signal.

Furthermore, a reset-purpose second on-pulse generation circuit for resetting the second flip-flop circuit 250 is constituted of a first negative-OR (NOR) circuit 254 that receives inputs of the signal [1] and the signal [2], and a logical sum of its output signal (signal [6]) and the reset clock signal is used as a reset signal (signal [7]).

In FIG. 9, the generation and the end of the first PWM on-pulse and the generation and the end of the second PWM on-pulse in a first switching cycle are similar to those in FIG. 2. However, the generation of the second PWM on-pulse in the next switching cycle differs. In synchronization with the falling of the output voltage of the first comparator circuit 130 at a time td10 in the next switching cycle, a signal [3] rises, and an on-pulse appears in the second control signal. The second flip-flop circuit 250 is set, and the second PWM on-pulse is generated. When the error voltage Verror becomes lower than the ramp voltage Vramp at a time td11, the on-pulse of the second control signal ends (returns to a low level). Thereafter, the reset clock signal becomes an on-pulse at a time td12 immediately before the end of the switching cycle, and the second PWM on-pulse ends.

Accordingly, in the third embodiment, in addition to the effects of the first embodiment, since the generation timing of the first PWM on-pulse generated in the next switching cycle and the generation timing of the second PWM on-pulse overlap each other and the pulse width of the second PWM on-pulse is longer, the pulse width in the next switching cycle can be increased compared with FIG. 2. Therefore, since the voltage drop can be more suppressed when a change in current larger than that of the first embodiment occurs, this embodiment is suitable for controlling a power supply that handles a large current.

Fourth Embodiment

Figure 10:
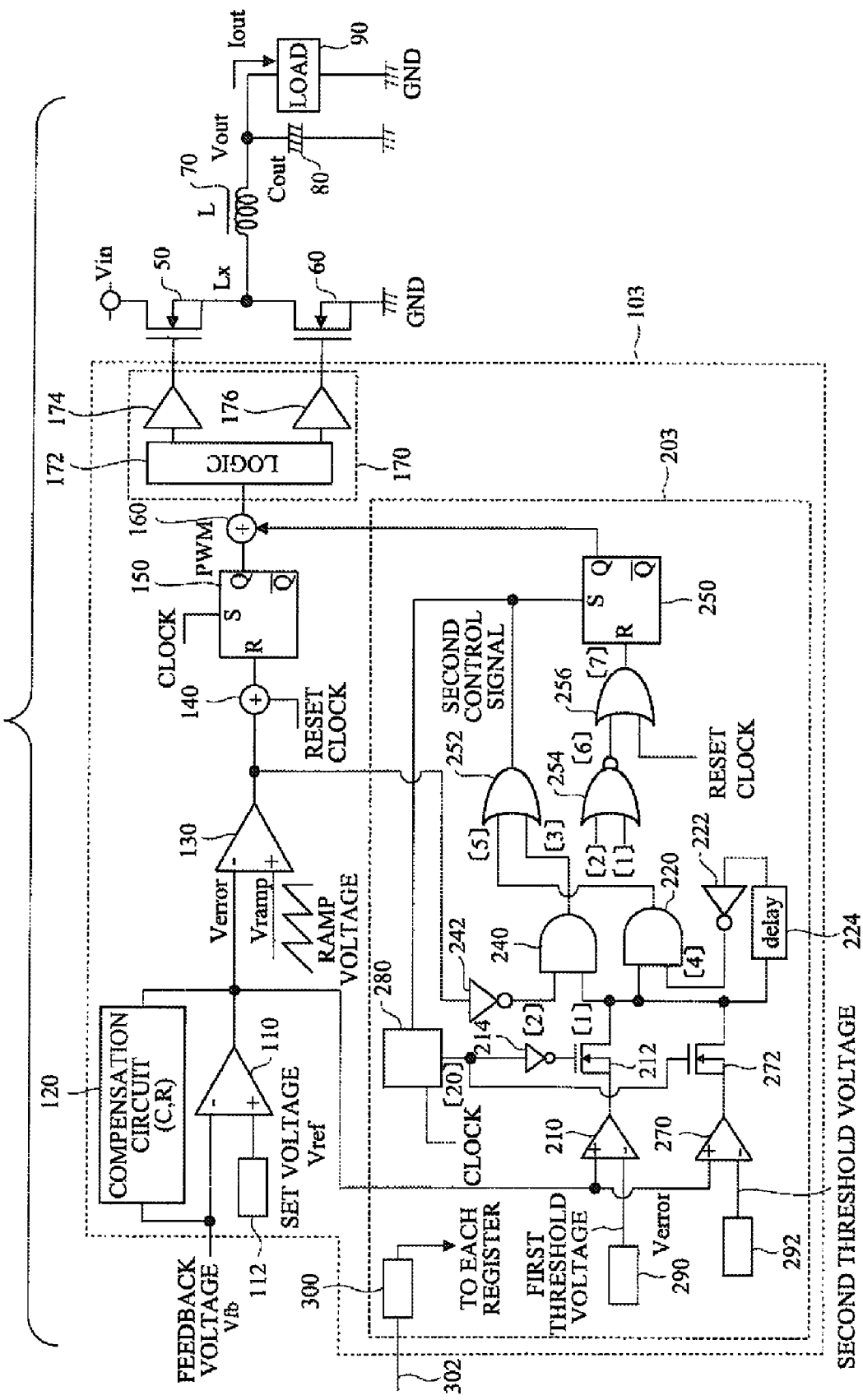
FIG. 10 is a circuit block diagram of a semiconductor device and a power supply using the same according to a fourth embodiment of the present invention.
Figure 11:
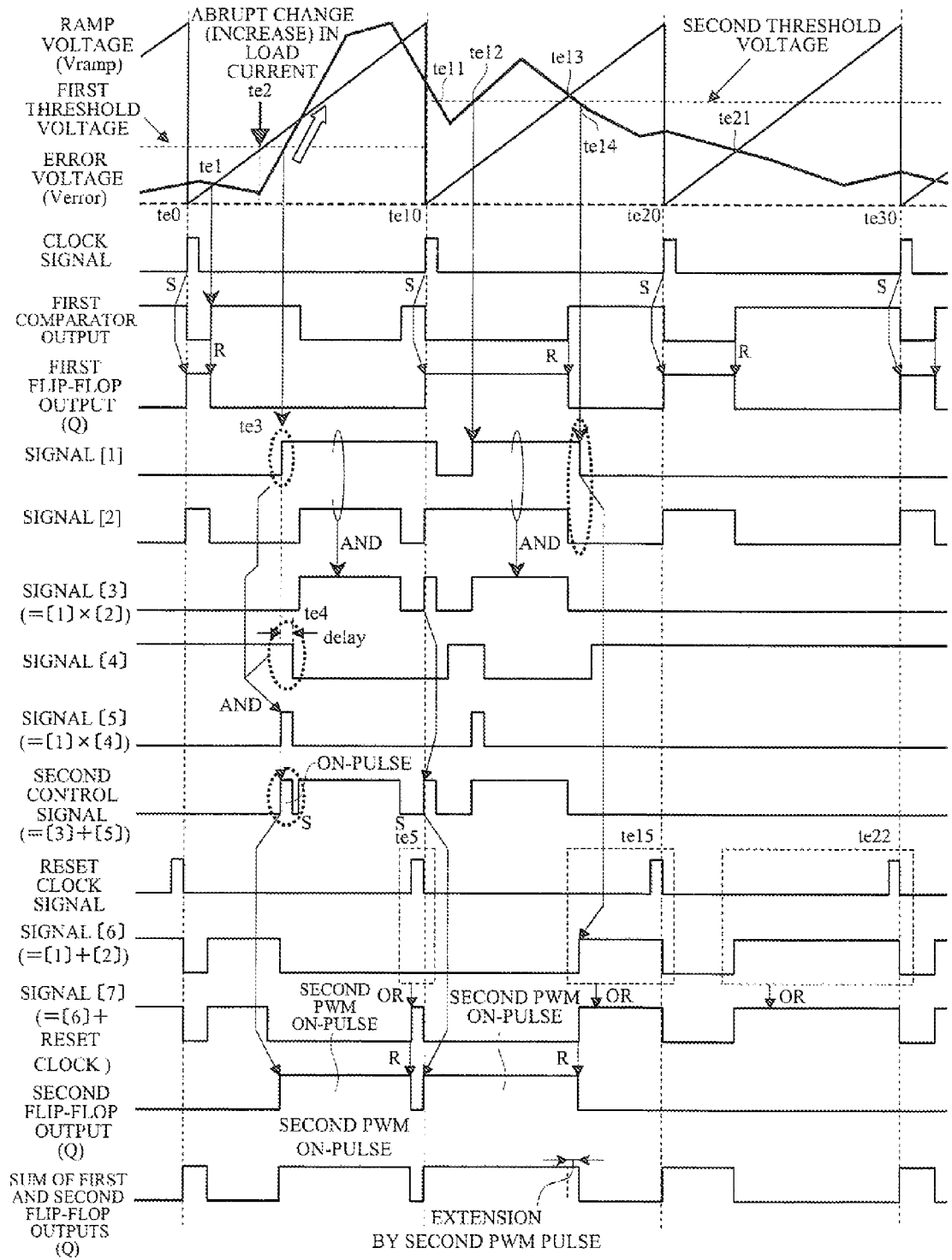
FIG. 11 is a timing waveform diagram for describing the operation inside the semiconductor device shown in FIG. 10.

A fourth embodiment of the present invention will be described with reference to FIG. 10 and FIG. 11. FIG. 10 is a circuit block diagram of a semiconductor device and a power supply using the same according to the fourth embodiment of the present invention. FIG. 11 is a drawing schematically showing the timing waveforms for describing the operation inside the semiconductor device shown in FIG. 10.

The difference between a power supply 13 of the fourth embodiment and that of the third embodiment lies in that means for controlling the end of the second PWM on-pulse generated in the next switching cycle is added to the control means described in the third embodiment. Therefore, in the fourth embodiment, in a second PWM on-pulse generation circuit 203 of the power-supply control IC 103, a third comparator circuit 270 that compares the error voltage Verror and a second threshold voltage, a threshold-voltage switching signal generation circuit 280 for selecting either one of an output signal of the second comparator 210 and an output signal of the third comparator circuit 270, a first switch 212 that switches between passage and interruption of the output signal of the second comparator circuit 210 in reception of an inverted signal of an output signal (signal [20]) of the threshold-voltage switching signal generation circuit 280, a second switch 272 that switches between passage and interruption of the output signal of the third comparator circuit 270 in reception of the signal [20], and a second-threshold-voltage setting circuit 292 are added as shown in FIG. 10.

In FIG. 11, the generation and the end of the first PWM on-pulse, the generation and the end of the second PWM on-pulse in the first switching cycle, and the generation of the second PWM on-pulse in the next switching cycle are similar to those in FIG. 9. However, the end of the second PWM on-pulse in the next switching cycle differs.

When the clock signal rises at a time te10 in the next switching cycle, the output voltage of the first comparator circuit 130 falls and the first PWM on-pulse is generated. Also, in synchronization with the falling of the output voltage of the first comparator circuit 130, the signal [3] rises, and an on-pulse appears in the second control signal. As a result, the second flip-flop circuit 250 is set, and the second PWM on-pulse is generated. Thereafter, the error voltage Verror once becomes lower than the second threshold voltage at a time te11, and then exceeds it again at a time te12. Therefore, since the signal [3] also falls to a low level and then rises to a high level again, an on-pulse appears again in the second control signal, but it does not affect the second PWM on-pulse. At a time te13, the error voltage Verror becomes lower than the ramp voltage Vramp, the output signal of the first comparator circuit 130 rises to a high level, and the first PWM on-pulse ends.

Then, at a time te14, the error voltage Verror becomes lower than the second threshold voltage, and the voltage of the signal [1] falls to a low level. At this time, since the voltage of the signal [2] is at a low level, the voltage of an output signal (signal [6]) of the first NOR circuit 254 rises to a high level. As a result, the second PWM on-pulse ends. Since the first and second PWM on-pulses are generated approximately at the same time and the second PWM on-pulse ends later, the PWM on-pulse width is extended similarly to the third embodiment. However, since the extended length of the PWM on-pulse width can be varied by the set value of the second threshold voltage, the range of the load current that can be handled by the power supply 13 is wider compared with the third embodiment.

Figure 12:
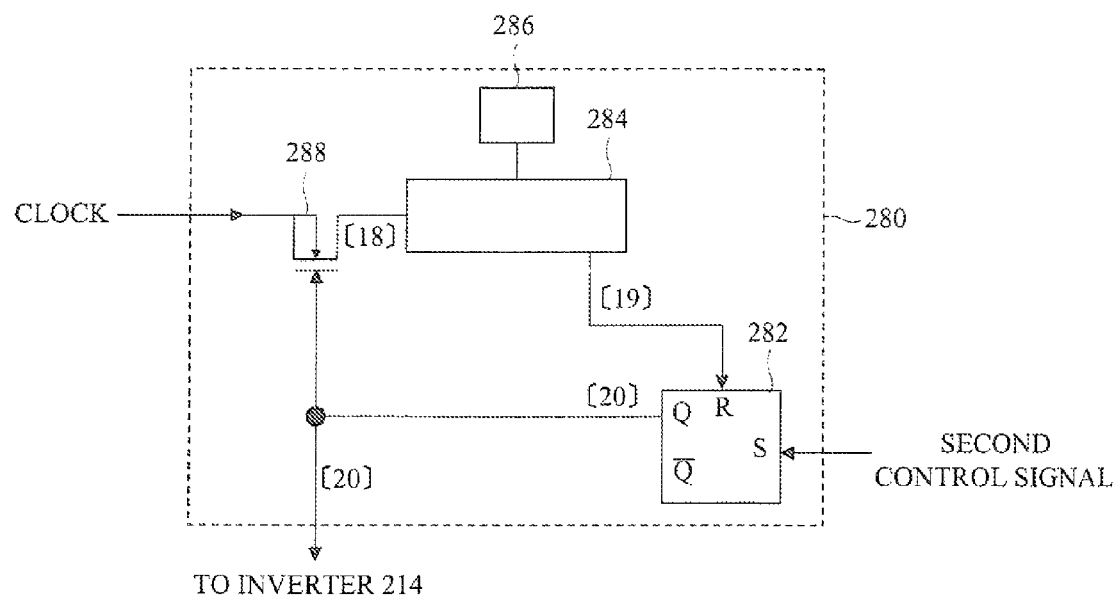
FIG. 12 is a circuit block diagram of a configuration example of a threshold-voltage switching signal generation circuit used in the semiconductor device shown in FIG. 10.
Figure 13:
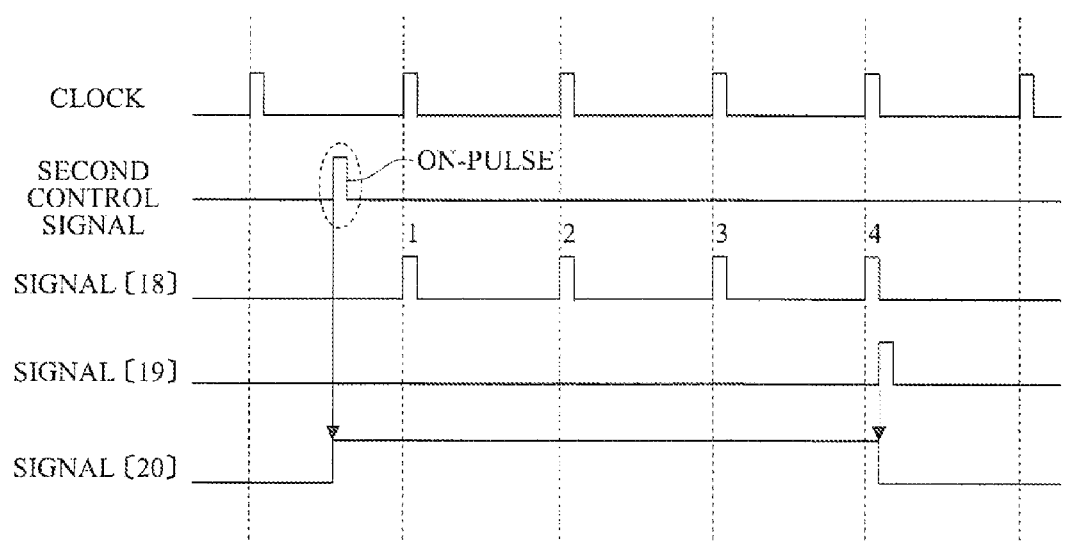
FIG. 13 is a timing waveform diagram for describing the operation of the threshold-voltage switching signal generation circuit shown in FIG. 12.

FIG. 12 is a circuit block diagram of a configuration example of a threshold-voltage switching signal generation circuit 280 used in the fourth embodiment. FIG. 13 is a timing waveform diagram for describing the operation of the threshold-voltage switching signal generation circuit shown in FIG. 12.

As shown in FIG. 12, the threshold-voltage switching signal generation circuit 280 includes a third flip-flop circuit 282, a programmable counter circuit 284, a program input circuit 286, and a third switch 288. The second control signal and a clear signal (signal [19]) of the programmable counter circuit 284 are input to a set signal input (S) and a reset signal input (R) of the third flip-flop circuit 282, respectively. Also, the output signal (Q) (signal [20]) of the third flip-flop circuit 282 enters the input of an inverter 214 and also enters control inputs of switches 272 and 288 (for example, the gate inputs thereof when the switches 272 and 288 are MOS transistors). For example, the programmable counter circuit 284 is a three-bit pre-settable down-counter circuit. Also, the program input circuit 286 has a three-bit register incorporated therein, and a count value N for clearing the counter of the programmable counter circuit 284 is determined by the settings of the register. A clock signal enters on an input side of the third switch 288, and an output thereof enters a clock input of the programmable counter circuit 284 as a signal [18].

The operation of switching the threshold voltage will be described with reference to FIG. 13. When an on-pulse appears in the second control signal, the voltage of the output signal (signal [20]) of the third flip-flop circuit 282 becomes a high level. Then, since the gate voltage of the first switch 212 becomes a low level and the gate voltage of the second switch 272 becomes a high level in FIG. 10, the first switch 212 is turned off and the second switch is turned on. As a result, the output signal of the third comparator circuit 270 that compares the error voltage Verror and the second threshold voltage is transmitted to the set-purpose first on-pulse generation circuit on the next stage (constituted of the first AND circuit 220, the inverter circuit 222, and the delay circuit 224). Simultaneously, the third switch 288 is turned on, and a clock signal appears in the signal [18]. Then, the counter of the pre-settable down-counter circuit (284) is counted down at each rising of the on-pulse of the clock signal.

Since the N value is set to 4 in the fourth embodiment, the clear signal (signal [19]) causes an on-pulse to be generated at the same time when the fourth on-pulse of the clock signal enters the counter circuit, and in synchronization with the rising thereof, the voltage of the output signal of the third flip-flop circuit 282 becomes a low level. As a result, the first switch 212 is turned on, and the second switch 272 is turned off. Then, the output signal of the second comparator circuit 210 that compares the error voltage Verror and the first threshold voltage is transmitted to the set-purpose first on-pulse generation circuit on the next stage. In this manner, the threshold voltage can be switched to the second threshold voltage over N cycles (in the description of the present embodiment, N=4) from the next cycle of the switching cycle in which the second PWM on-pulse is generated.

In the fourth embodiment, the case where, in the second PWM on-pulse generation circuit 200, the error voltage Verror and the first threshold voltage are compared with each other by the second comparator circuit 210 and the error voltage Verror and the second threshold voltage are compared with each other by the third comparator circuit 270 has been described, but it is not meant to be restrictive. For example, in place of the error voltage Verror, a) the output voltage Vout, b) the feedback voltage Vfb obtained by converting the output voltage Vout at a predetermined ratio via the voltage-dividing resistance, or c) a difference voltage between the feedback voltage Vfb and the output set voltage Vref may be compared with the first threshold voltage by the second comparator circuit 210 and with the second threshold voltage by the third comparator circuit 270. In this case, it is needless to say that the values of the first and second threshold voltages are varied depending on the type of the target voltage for comparison. Also, the above replacement can be applied to the following embodiments.

Fifth Embodiment

Figure 14:
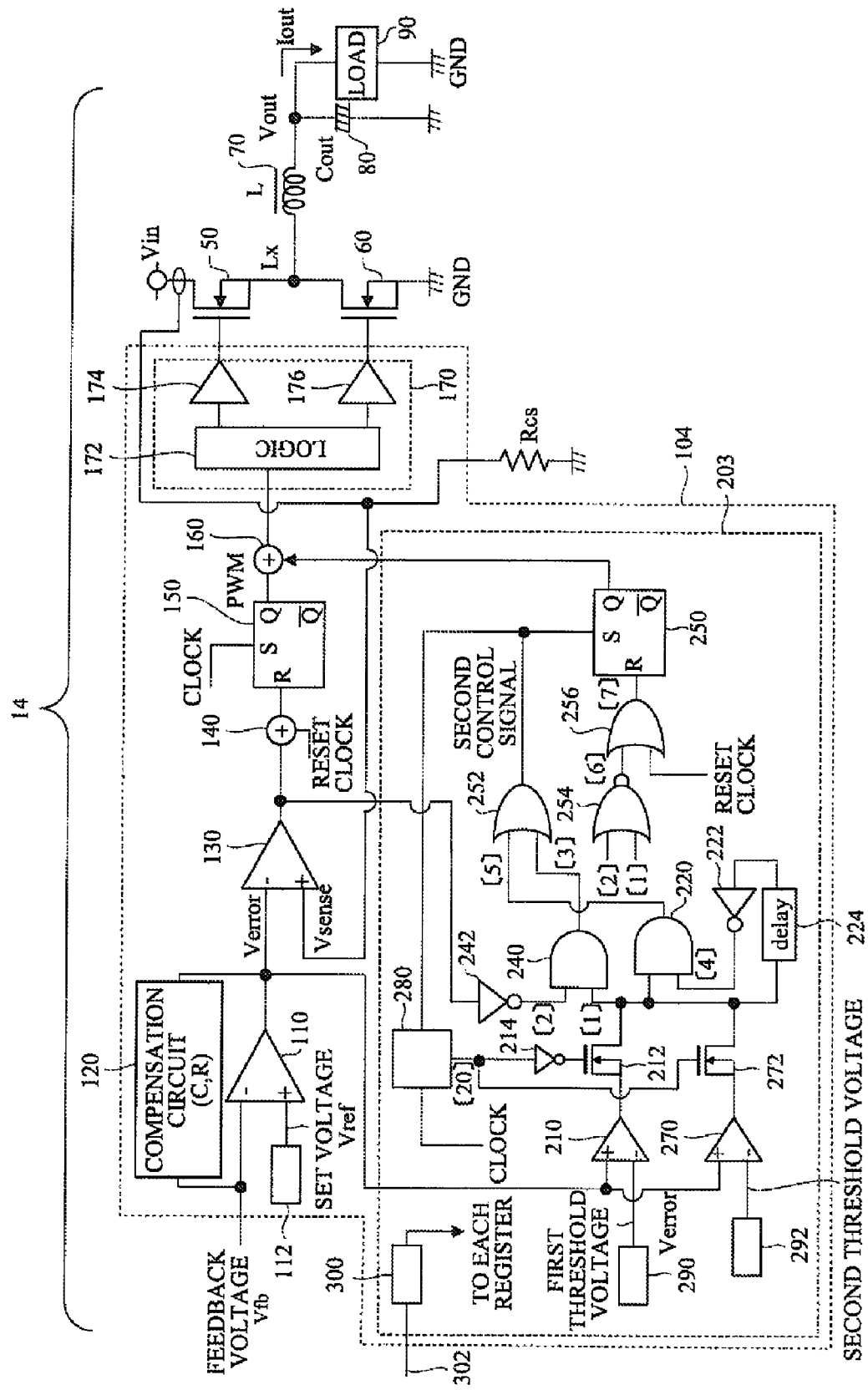
FIG. 14 is a circuit block diagram of a semiconductor device and a power supply using the same according to a fifth embodiment of the present invention.
Figure 15:
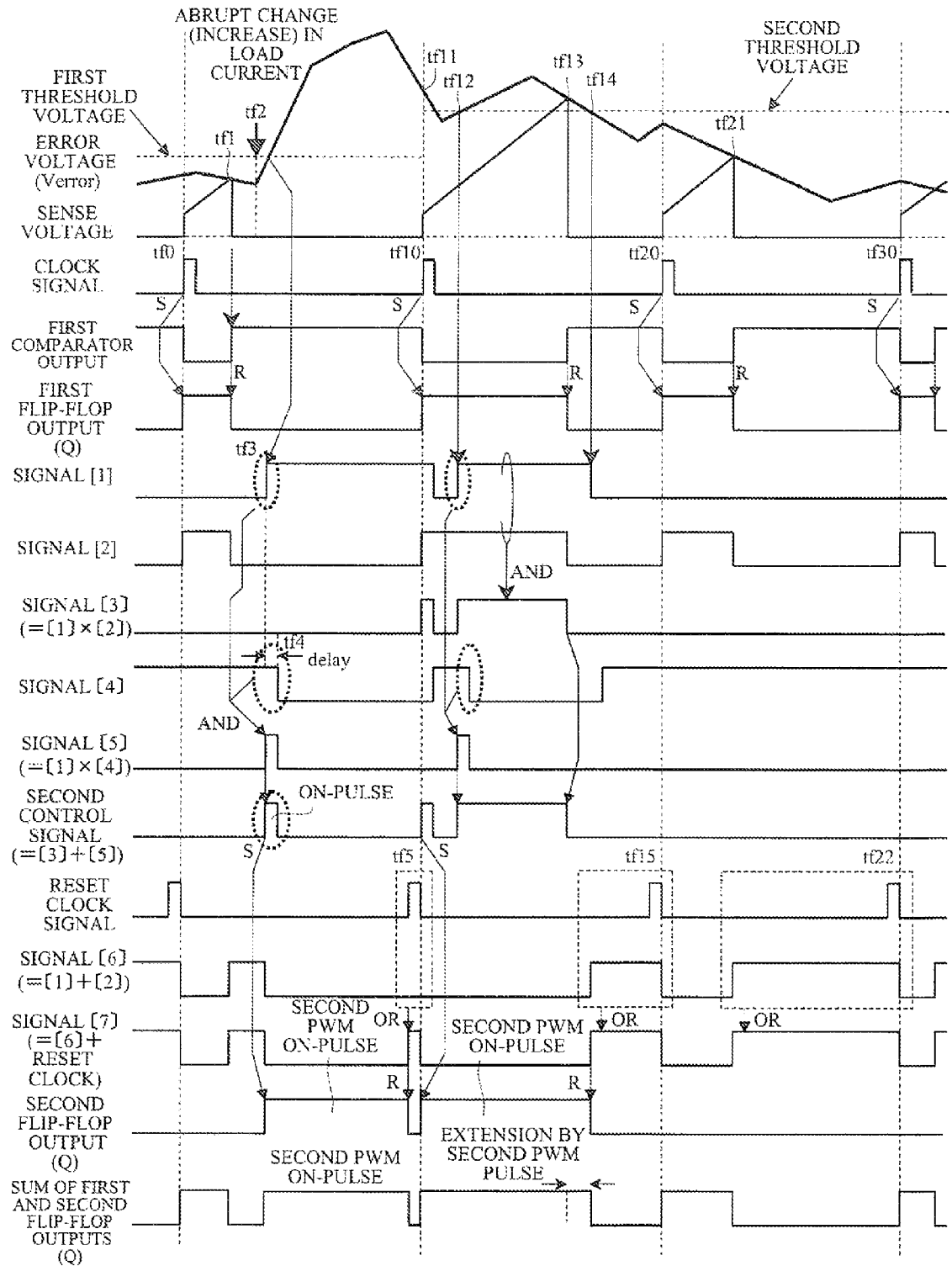
FIG. 15 is a timing waveform diagram for describing the operation inside the semiconductor device shown in FIG. 14.

A fifth embodiment will be described with reference to FIG. 14 and FIG. 15. FIG. 14 is a circuit block diagram of a semiconductor device and a power supply using the same according to the fifth embodiment of the present invention. FIG. 15 is a drawing schematically showing timing waveforms for describing the operation inside the semiconductor device shown in FIG. 14.

The difference between a power supply 14 of the fifth embodiment and that of the fourth embodiment lies in that a different feedback control mode of a power-supply control IC 104 is used. In the first to fourth embodiments, the case where voltage mode control is used as feedback control for outputting a constant voltage has been described. In the fifth embodiment, however, the case of using peak current mode control will be described. Even with the use of the peak current mode control, the power-supply control IC 104 according to the fifth embodiment can achieve operations and effects similar to those in the case of voltage mode control.

As shown in FIG. 14, the power-supply control IC 104 of the fifth embodiment includes the error amplifier 110, the output-voltage setting circuit 112, the compensation circuit 120, the first comparator circuit 130, the adders 140 and 160, the first flip-flop circuit 150, the driver circuit 170, and the second PWM on-pulse generation circuit 203. The difference from the fourth embodiment in the circuit configuration is that a voltage Vsense enters one of the inputs of the first comparator circuit 130 in place of the ramp voltage Vramp. This voltage Vsense is obtained by detecting the drain current of the high-side power MOSFET 50 reduced to one several thousandth to one several tens of thousandth, and then converting the detected current to a voltage with a resistor Rcs.

The operation timing waveforms are shown in FIG. 15. Although the ramp voltage Vramp is replaced by the sense voltage Vsense, the basic operation timings are approximately similar to those of the fourth embodiment (FIG. 11) except that a constant voltage is applied to the sense voltage in advance and that the sense voltage returns to a zero voltage when it matches the error voltage Verror.

When the clock signal becomes an on-pulse at a time tf0, the output voltage (Q) of the first flip-flop circuit 150 becomes a high level, and the first PWM on-pulse is generated. At the same time, the sense voltage Vsense starts to increase, and when the sense voltage Vsense matches the error voltage Verror at a time tf1, the output voltage of the first comparator circuit 130 becomes a high level. For this reason, the output signal (Q) of the first flip-flop circuit 150 returns to a low level again, and the first PWM on-pulse ends. After the end of the first PWM on-pulse, when the load current is abruptly changed (increased) at a time tf2, the error voltage Verror is increased. When the error voltage Verror exceeds the first threshold voltage at a time tf3, the voltage of the output signal (signal [1]) of the second comparator circuit 210 becomes a high level.

Then, since the inverted delay signal thereof (signal [4]) becomes a low level at a time tf4 after a predetermined delay, the output signal (signal [5]) of the first AND circuit 220 becomes an on-pulse. Upon reception of the rising of this on-pulse, the output voltage of the second flip-flop circuit 250 becomes a high level, and the second PWM on-pulse is generated. The second PWM on-pulse is input to the driver circuit 170 via the adder 160. At a time tf5, the reset clock signal becomes an on-pulse and enters the reset signal input (R) of the second flip-flop circuit 250. Therefore, the output signal of the second flip-flop circuit 250 returns to a low level, and the second PWM on-pulse ends.

When the clock signal rises at a time tf10 in the next switching cycle, the output voltage of the first comparator circuit 130 falls, and a first PWM on-pulse is generated. Also, in synchronization with the falling of the output voltage of the first comparator circuit 130, the signal [3] rises, and an on-pulse appears in the second control signal. As a result, the second flip-flop circuit 250 is set, and a second PWM on-pulse is generated. Thereafter, the error voltage Verror once becomes lower than the second threshold voltage at a time tf11, and then exceeds it again at a time tf12. Therefore, since the signal [3] also falls to a low level and then rises to a high level again, an on-pulse appears again in the second control signal, but it does not affect the second PWM on-pulse. At a time tf13, the error voltage Verror matches the sense voltage Vsense, the output signal of the first comparator circuit 130 rises to a high level, and the first PWM on-pulse ends.

Thereafter, at a time tf14, the error voltage Verror becomes lower than the second threshold voltage, and the voltage of the signal [1] falls to a low level. At this time, since the voltage of the signal [2] is at a low level, the voltage of the output signal (signal [6]) of the first negative-OR (NOR) circuit 254 rises to a high level. As a result, the second PWM on-pulse ends. Since the first and second PWM on-pulses are generated approximately at the same time and the second PWM on-pulse ends later, the PWM on-pulse width is extended similarly to the fourth embodiment. However, since the extended length of the PWM on-pulse width can be varied by the set value of the second threshold voltage, the range of the load current that can be handled by the power supply 14 is wider similarly to the fourth embodiment.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in FIGS. 1, 6, 8, 10, and 14, the cases where the driver circuit 170 is formed in the chips of the power-supply control ICs 100, 101, 102, 103, and 104, respectively have been described. Alternatively, the driver circuit 170 may be a driver IC separate from the power-supply control ICs 100, 101, 102, 103, and 104.

Also, in the description of the first to fifth embodiments, the chips of the power-supply control ICs 100, 101, 102, 103, and 104, the high-side power MOSFET 50, and the low-side power MOSFET 60 are integrated in one package. However, the effectiveness of the present invention does not change even when these chips are packaged separately. Also, in the above, the power-supply control ICs and the driver IC may be separate chips and be contained in separate packages.

Furthermore, in FIG. 14, the case of the second PWM on-pulse generation circuit 203, which is identical to that of FIG. 10 (fourth embodiment) has been described. Alternatively, as a matter of course, this second PWM on-pulse generation circuit 203 can be replaced by the second PWM on-pulse generation circuit 200 of FIG. 1 (first embodiment), the second PWM on-pulse generation circuit 201 of FIG. 6 (second embodiment), or the second PWM on-pulse generation circuit 202 of FIG. 8 (third embodiment). Even in this case, it is needless to say that the effectiveness of the present invention does not change.

Still further, in the present embodiments, the cases where the voltage mode control (first to fourth embodiments) and the peak current mode control (fifth embodiment) are used as feedback control modes of the power-supply control IC have been described. Alternatively, it is needless to say that the effectiveness of the present invention does not change even in the case of using another feedback control mode such as average current mode control.

The semiconductor device according to the present invention is effectively applied to a switching power supply in which a power-supply control circuit includes a semiconductor device, and can be further widely applied to a manufacturing industry of semiconductor devices.

What is claimed is:

1. A semiconductor device included in a switching power supply which drives to turn on and off a semiconductor switching device connected to a DC power supply in series to supply a predetermined constant voltage to an external load, the semiconductor device comprising:
    a semiconductor circuit which controls on and off data states of the semiconductor switching device,
    wherein an output voltage of the switching power supply or a divided voltage obtained by dividing the output voltage at a predetermined ratio is used as a feedback voltage,
    wherein a pulse-width modulation signal is generated by comparing the feedback voltage and a set voltage, and
    wherein in one switching cycle in which the output voltage, the divided voltage, a difference voltage between the output voltage or the divided voltage and the set voltage, or an error voltage obtained by amplifying the difference voltage exceeds a first threshold voltage, a PWM on-pulse of a pulse-width modulation signal for turning the semiconductor switching device to the ON state is generated twice.

2. The semiconductor device according to claim 1, further comprising:
    a communication interface which transmits a signal to a register which sets the first threshold voltage.

3. A switching power supply which drives to turn on and off a semiconductor switching device to open and close a DC power supply to supply a predetermined constant voltage to an external load,
    wherein a power-supply control circuit which generates a signal for driving to turn on and off the semiconductor switching device includes the semiconductor device according to claim 1.

* * * * *